US008928827B2

(12) United States Patent
Tsai et al.

(10) Patent No.: US 8,928,827 B2

(45) Date of Patent: Jan. 6, 2015

(54) LIQUID CRYSTAL DISPLAY

(75) Inventors: Yu Tsai, Tainan (TW); Che-Yu Chuang, Changhua County (TW)

(73) Assignee: HannStar Display Corp., New Taipei (TW)

( * ) Notice: Subject to any disclaimer, the term of this patent is extended or adjusted under 35 U.S.C. 154(b) by 629 days.

(21) Appl. No.: 13/214,442

(22) Filed: Aug. 22, 2011

(65) Prior Publication Data

US 2012/0262641 A1 Oct. 18, 2012

(30) Foreign Application Priority Data

Apr. 18, 2011 (TW) ............................ 100113366 A

(51) Int. Cl.

*G02F 1/136* (2006.01)
*G02F 1/1343* (2006.01)
*G09G 3/36* (2006.01)

(52) U.S. Cl.

CPC ...... *G09G 3/3648* (2013.01); *G09G 2300/0426* (2013.01); *G09G 2300/0465* (2013.01)

USPC .............................. 349/43; 349/139; 349/143

(58) Field of Classification Search

USPC ......................... 349/43, 139, 143; 257/59, 72

See application file for complete search history.

(56) References Cited

U.S. PATENT DOCUMENTS

| | | | | |
|---|---|---|---|---|
| 6,202,191 | B1 * | 3/2001 | Filippi et al. | 257/522 |
| 6,711,727 | B1 * | 3/2004 | Teig et al. | 716/129 |
| 2001/0015715 | A1 * | 8/2001 | Hebiguchi et al. | 345/92 |
| 2011/0285950 | A1 * | 11/2011 | Su et al. | 349/139 |

FOREIGN PATENT DOCUMENTS

| | | | |
|---|---|---|---|
| TW | 491959 | B | 6/2002 |
| TW | 201017304 | A | 5/2010 |
| TW | 201109775 | A | 3/2011 |

* cited by examiner

*Primary Examiner* — Edward Glick

*Assistant Examiner* — David Chung

(74) *Attorney, Agent, or Firm* — Muncy, Geissler, Olds & Lowe, P.C.

(57) ABSTRACT

An embodiment of this invention provides a liquid crystal display, which comprises a thin-film transistor substrate, an upper substrate, and a liquid crystal between the two substrates. The thin-film transistor substrate comprises data lines, gate lines, and a pixel array defined by the data lines and gate lines, characterized in that each data line connects to two columns of pixel, and another one or two columns of pixel are interposed between the connected two columns of pixel.

10 Claims, 12 Drawing Sheets

| | $S_1$ | $S_2$ | $S_3$ | $S_4$ | $S_5$ | $S_6$ |
|---|---|---|---|---|---|---|
| $g_1$ | $R_1$ | $G_1$ | $R_2$ | $B_2$ | $G_3$ | $R_4$ |
| $g_2$ | $B_1$ | $G_2$ | $R_3$ | $B_3$ | $G_4$ | $B_4$ |
| $g_3$ | $R_5$ | $G_5$ | $R_6$ | $B_6$ | $G_7$ | $R_8$ |
| $g_4$ | $B_5$ | $G_6$ | $R_7$ | $B_7$ | $G_8$ | $B_8$ |
| $g_5$ | $R_9$ | $G_9$ | $R_{10}$ | $B_{10}$ | $G_{11}$ | $R_{12}$ |
| $g_6$ | $B_9$ | $G_{10}$ | $R_{11}$ | $B_{11}$ | $G_{12}$ | $B_{12}$ |
| $g_7$ | $R_{13}$ | $G_{13}$ | $R_{14}$ | $B_{14}$ | $G_{15}$ | $R_{16}$ |
| $g_8$ | $B_{13}$ | $G_{14}$ | $R_{15}$ | $B_{15}$ | $G_{16}$ | $B_{16}$ |

FIG.2B

| | S1 | S2 | S3 | S4 |
|---|---|---|---|---|
| g1 | P(1, 1) | P(2, 1) | P(5, 1) | P(6, 1) |
| g2 | P(3, 1) | P(4, 1) | P(7, 1) | P(8, 1) |
| g3 | P(1, 2) | P(2, 2) | P(5, 2) | P(6, 2) |
| g4 | P(3, 2) | P(4, 2) | P(7, 2) | P(8, 2) |
| g5 | P(1, 3) | P(2, 3) | P(5, 3) | P(6, 3) |
| g6 | P(3, 3) | P(4, 3) | P(7, 3) | P(8, 3) |
| g7 | P(1, 4) | P(2, 4) | P(5, 4) | P(6, 4) |
| g8 | P(3, 4) | P(4, 4) | P(7, 4) | P(8, 4) |
| g9 | P(1, 5) | P(2, 5) | P(5, 5) | P(6, 5) |
| g10 | P(3, 5) | P(4, 5) | P(7, 5) | P(8, 5) |

FIG.4B

LIQUID CRYSTAL DISPLAY

CROSS REFERENCE TO RELATED APPLICATIONS

The entire contents of Taiwan Patent Application No. 100113366, filed on Apr. 18, 2011, from which this application claims priority, are incorporated herein by reference.

BACKGROUND OF THE INVENTION

1. Field of the Invention

The present invention generally relates to liquid crystal displays with low cost and well display quality.

2. Description of the Prior Art

Liquid crystal displays typically have a circuit constructed by data lines and gate lines, which are orthogonal to each other. In addition, a data driver drives the data lines, and a scan driver (or gate driver) drives the gate lines. Because higher resolution is needed, the number of data lines and hence the number of the data drivers must be increased, resulting higher cost.

One method to lower the cost is to decrease the number of the data lines. Prior art provides a "dual gate circuit" for this purpose. FIG. 1 shows a conventional liquid crystal display with a dual gate circuit. As shown in FIG. 1, in each row of pixel electrodes, such as the row of pixel electrodes P1, P2, P3 . . . P6, each two adjacent pixel electrodes connect to the same data line. For example, the pixel electrodes P1 and P2 connect to data line s1, pixel electrodes P3 and P4 connect to data line s2, and so on. In addition, each two adjacent pixel electrodes connect to different gate lines. For example, the pixel electrode P1 connects to gate line g1, while the pixel electrode P2 adjacent to P1 connects to gate lines g2.

The circuit shown in FIG. 1 can decrease the number of data lines; however, it may decay the display quality. When a scan voltage is inputted to the gate line g1, the thin-film transistors SW1, SW3, and SW5 are opened, and the date lines s1, s2, s3 respectively input a pixel voltage to the pixel electrode P1, P3, and P5 via the thin-film transistors SW1, SW3, and SW5. After that, a low voltage is inputted to the gate line g1, the scan voltage is inputted to the gate line g2 to open the thin-film transistors SW2, SW4, and SW6, and the date lines s1, s2, s3 respectively input the pixel voltage to the pixel electrode P2, P4, and P6 via the thin-film transistors SW2, SW4, and SW6. In this time, electrical potentials remain in the pixel electrodes P1, P3, and P5; hence, the remained electrical potential in pixel electrode P2 disturbs the potential of the pixel electrode P3, the remained electrical potential in pixel electrode P4 disturbs the potential of the pixel electrode P5, and the potential of the pixel electrodes P3 and P5 will be coupled, resulting vertical mura.

Therefore, it would be beneficial to provide novel liquid crystal displays with low cost and excellent display quality as well.

SUMMARY OF THE INVENTION

An object of the present invention is to provide novel liquid crystal displays with low cost and excellent display quality as well.

Accordingly, a first embodiment of this invention provides a liquid crystal display that comprises a thin-film transistor substrate, an upper substrate, and a liquid crystal layer arranged between the upper substrate and the thin-film transistor substrate, wherein the thin-film transistor substrate comprises a pixel array constructed by a plurality gate lines and a plurality of data lines orthogonal to the gate lines, characterized in that: except a first data line and a last data line of the data lines, each data line comprises two sub-data lines, and each sub-data line connects to pixel electrodes of one column of pixels of the pixel array, such that each data line connects to two columns of pixels, wherein the connected two columns are not adjacent to each other, and another two columns of pixels are interposed between the connected two columns of pixels.

Accordingly, a second embodiment of this invention provides a liquid crystal display that comprises a thin-film transistor substrate, an upper substrate, and a liquid crystal layer arranged between the upper substrate and the thin-film transistor substrate, wherein the thin-film transistor substrate comprises a pixel array constructed by a plurality gate lines and a plurality of data lines orthogonal to the gate lines, characterized in that: each data line comprises two sub-data lines, and each sub-data line connects to pixel electrodes of one column of pixels of the pixel array, such that each data line connects to two columns of pixels, wherein the connected two columns are not adjacent to each other, and another one columns of pixels is interposed between the connected two columns of pixels.

BRIEF DESCRIPTION OF THE DRAWINGS

FIG. 2A to FIG. 2C shows a liquid crystal display according to a first preferred embodiment of this invention, in which FIG. 2A shows its pixel structure, FIG. 2B shows the driving map between the pixel electrodes, data lines, and gate lines, and FIG. 2C shows its circuit diagram.

FIG. 3A and FIG. 3B show a data line structure according to an embodiment of this invention, in which FIG. 3B is a cross-sectional view taken along line A-A' shown in FIG. 3A.

FIG. 4A to FIG. 4C shows a liquid crystal display according to a second embodiment of this invention, in which FIG. 4A shows its pixel structure, FIG. 4B shows the driving map between the pixel electrodes, data lines, and gate lines, and FIG. 4C shows its circuit diagram.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known components and process operations are not been described in detail in order not to unnecessarily obscure the present invention. While drawings are illustrated in details, it is appreciated that the quantity of the disclosed components may be greater or less than that disclosed, except expressly restricting the amount of the components.

Figure 1:
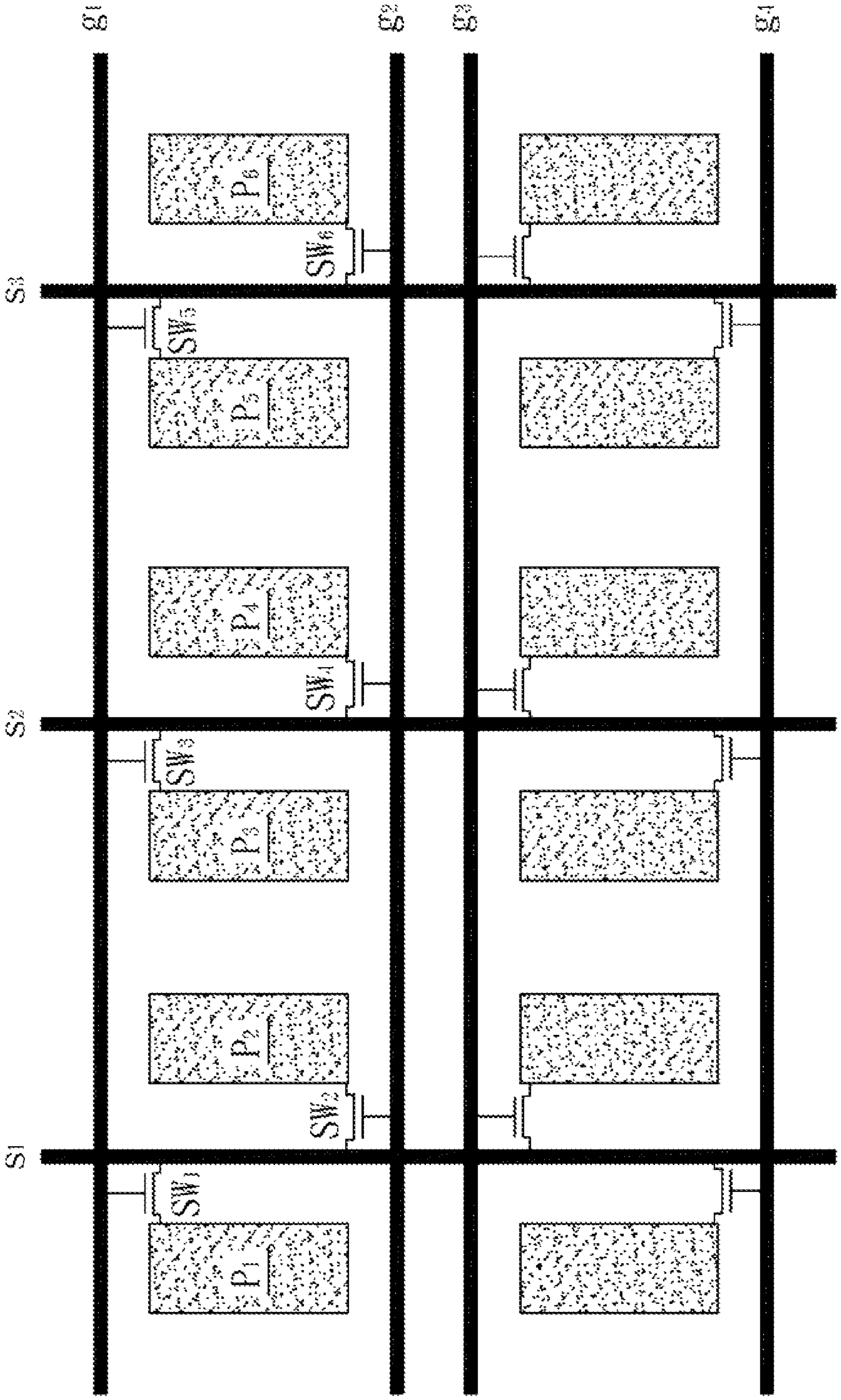
FIG. 1 shows a conventional liquid crystal display with a dual gate circuit.
Figure 2A:
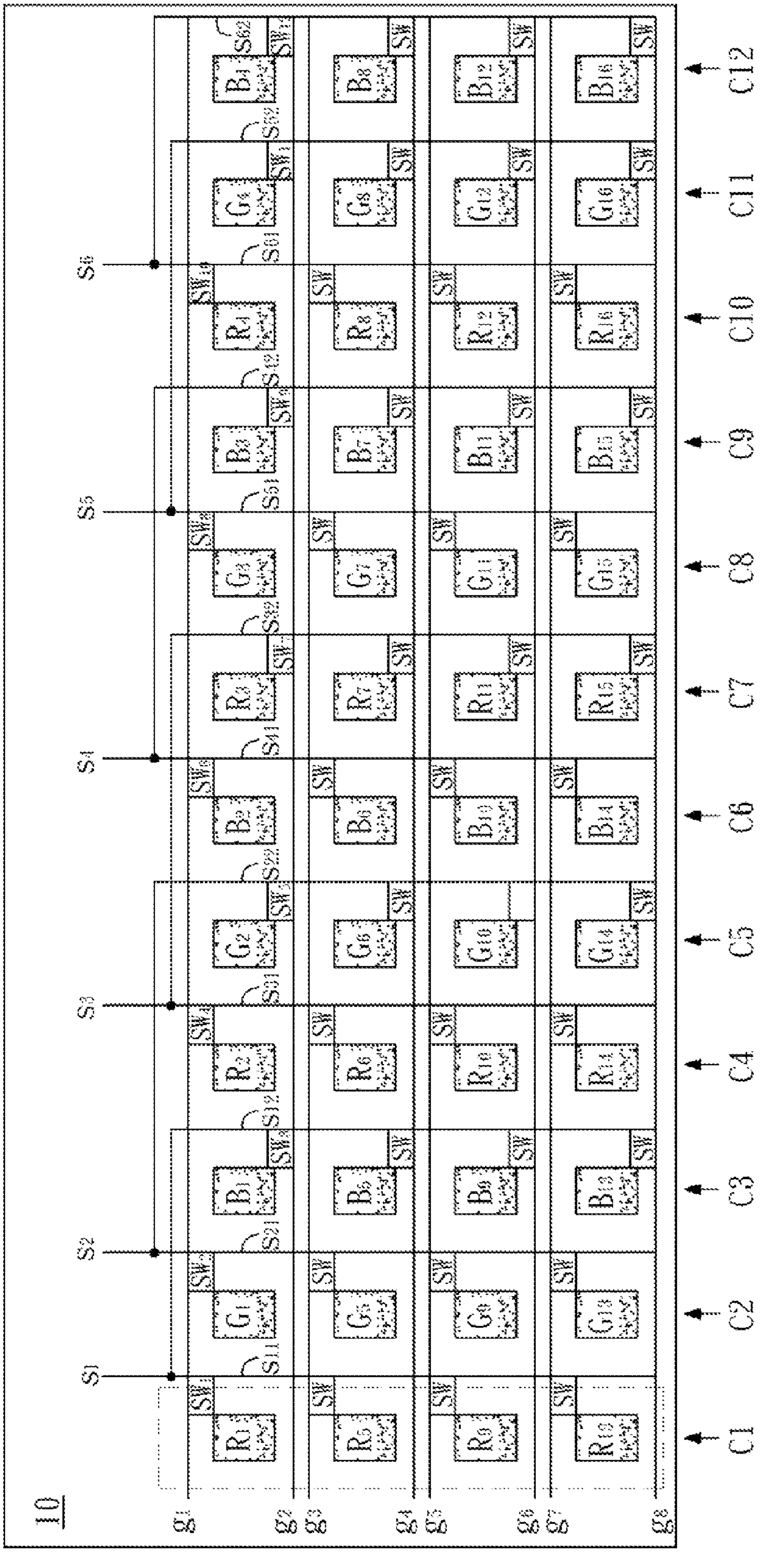
Figure 2C:
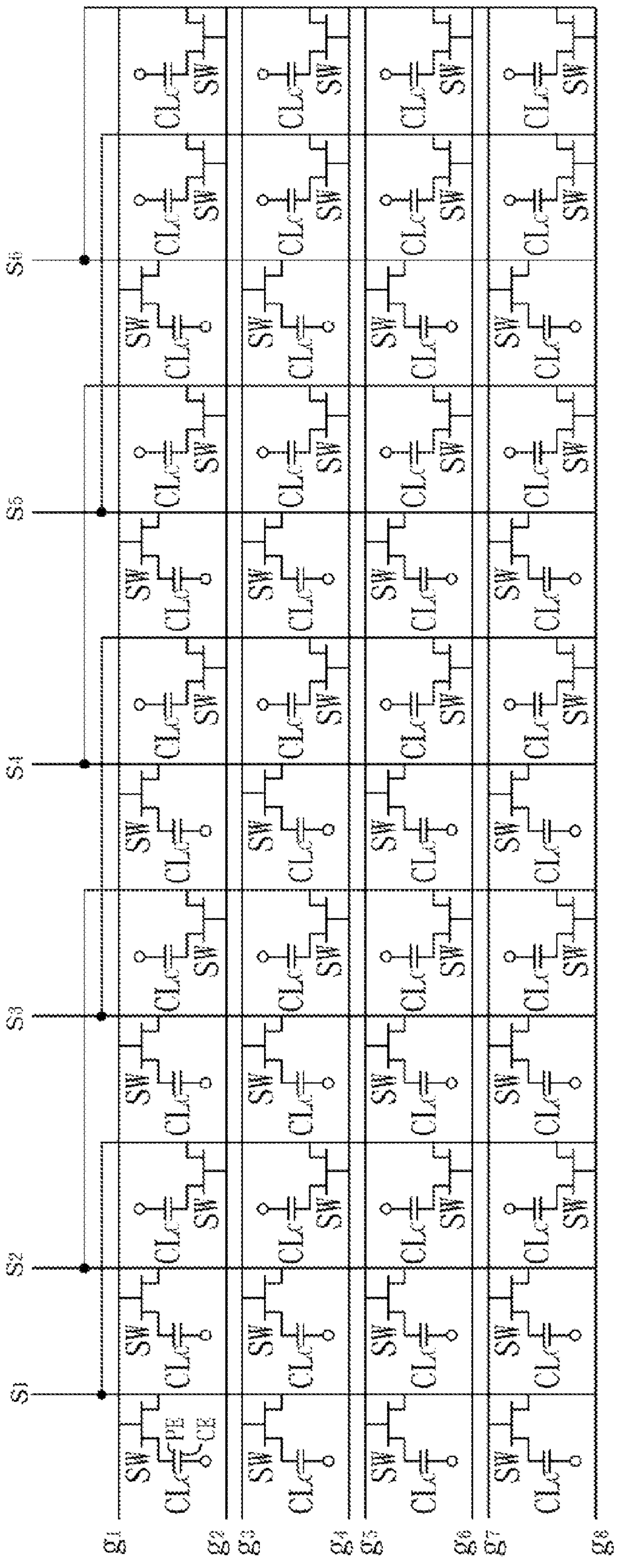

FIG. 2A to FIG. 2C shows a liquid crystal display according to a first preferred embodiment of this invention, in which FIG. 2A shows its pixel structure, FIG. 2B shows the driving map between the pixel electrodes, data lines, and gate lines, and FIG. 2C shows its circuit diagram.

Referring to FIG. 2A, the liquid crystal display of this embodiment comprises a thin-film transistor substrate 10 (also referred to as "lower substrate" in this context), an upper substrate (not shown), and a liquid crystal layer arranged between the upper substrate and the thin-film transistor substrate 10.

In addition, the thin-film transistor substrate 10 comprises a pixel array constructed by gate lines (g1, g2 . . . g8) and data lines (s1, s2 . . . s6), which are orthogonal to each other. Each pixel comprises a pixel electrode (R1, G1, B1 . . . ). The gate lines connect to at least one gate driver (not shown), and the data lines connect to at least one data driver (not shown). In this context, the term "connect" comprises or refers to "electrically connect" unless otherwise specified. In detail, except the first data line (such s1) and the last data line (such as s6), each data line comprises two sub-data lines, and each sub-data line connects to pixel electrodes of one column of pixels of the pixel array, such that each data line connects to two columns of pixels, where the connected two columns are not adjacent to each other. In addition, another two columns of pixels are interposed between the connected two columns of pixels. For example, the data line s2 comprises two sub-data lines s21 and s22 respectively connecting to the pixel electrodes of column C2 and column C5, and column C3 and column C4 are interposed between the Columns C2 and C5; the data line s3 comprises two sub-data lines s31 and s32 respectively connecting to the pixel electrodes of column C4 and column C7, and column C5 and column C6 are interposed between the Columns C4 and C7.

In addition, the first data line, such as s1, comprises two sub-data lines s11 and s12 respectively connecting to the pixel electrodes of column C1 and column C3, and another column C2 is interposed between the connected two columns of pixels C1 and C3; the last data line, such as s6, comprises two sub-data lines s61 and s62 respectively connecting to the pixel electrodes of column C10 and column C12, and another column C11 is interposed between the connected two columns of pixels C10 and C12.

In addition, the pixels of each row are driven by two gate lines. In each row of pixels, except the first pixel and the last pixel, the pixel electrodes of any two adjacent pixels connect to different gate lines. For example, the two pixel electrodes G1 and B1 are adjacent to each other in a row, in which the pixel electrode G1 connects to the gate line g1 via the thin-film transistor SW2, and the pixel electrode B1 connects to the gate line g2 via the thin-film transistor SW3; the two pixel electrodes R2 and G2 are adjacent to each other in a row, in which the pixel electrode R2 connects to the gate line g1 via the thin-film transistor SW4, and the pixel electrode G2 connects to the gate line g2 via the thin-film transistor SW5, and so on. The foregoing symbols R, G, and B respectively denote red, green, and blue pixels.

The foregoing structures not only can reduce the number of data lines to one half, and hence reduce the number of the data drivers and cost, but also can maintain the display quality. Referring to FIG. 2A and FIG. 2B, when a scan voltage is inputted to the gate line g1 to open the thin-film transistor SW1, SW2, SW4, SW6, SW8, and SW10, the data lines s1-s6 respectively input a pixel voltage to the pixel electrodes R1, G1, R2, B2, G3, and R4 via the thin-film transistors SW1, SW2, SW4, SW6, SW8, and SW10. After that, a low voltage is inputted to the gate line g1, the scan voltage is inputted to the gate line g2 to open the thin-film transistor SW3, SW5, SW7, SW9, SW11, and SW12, and the data lines s1-s6 respectively input a pixel voltage to the pixel electrodes B1, G2, R3, B3, G4, and B4 via the thin-film transistors SW3, SW5, SW7, SW9, SW11, and SW12. In the meanwhile, although the potentials are remained in the pixel electrodes R1, G1, R2, B2, G3, and R4, one sub-data line is interposed between each two adjacent pixel electrodes, so as to cancel out the capacitance couple between two adjacent pixel electrodes and thus maintain the display quality.

In addition, the driving ways of the pixel electrodes of the second row to the fourth row are similar to the first row as described above. FIG. 2B shows the detail.

FIG. 2C is a circuit diagram of the preferred embodiment. Each pixel comprises a pixel capacitance Clc constructed by a pixel electrode PE and a common electrode CE, and each pixel electrode PE connects to one data line and one gate line via a switch SW, such as a thin-film transistor. For example, a gate of the thin-film transistor SW connects to one gate line, a source of the thin-film transistor SW connects to one data line, and a drain of the thin-film transistor connects to the pixel electrode PE. Notice that other switches capable of performing the same functions as the thin-film transistor may replace it in other embodiments of this invention.

It is also appreciated that although the preferred embodiment only illustrates six data lines and eight gate lines, actually the number of the data lines and the gate lines may be more. In addition, the same driving mechanism may be used for liquid crystal display having various numbers of data lines and gate lines.

Figure 3A:
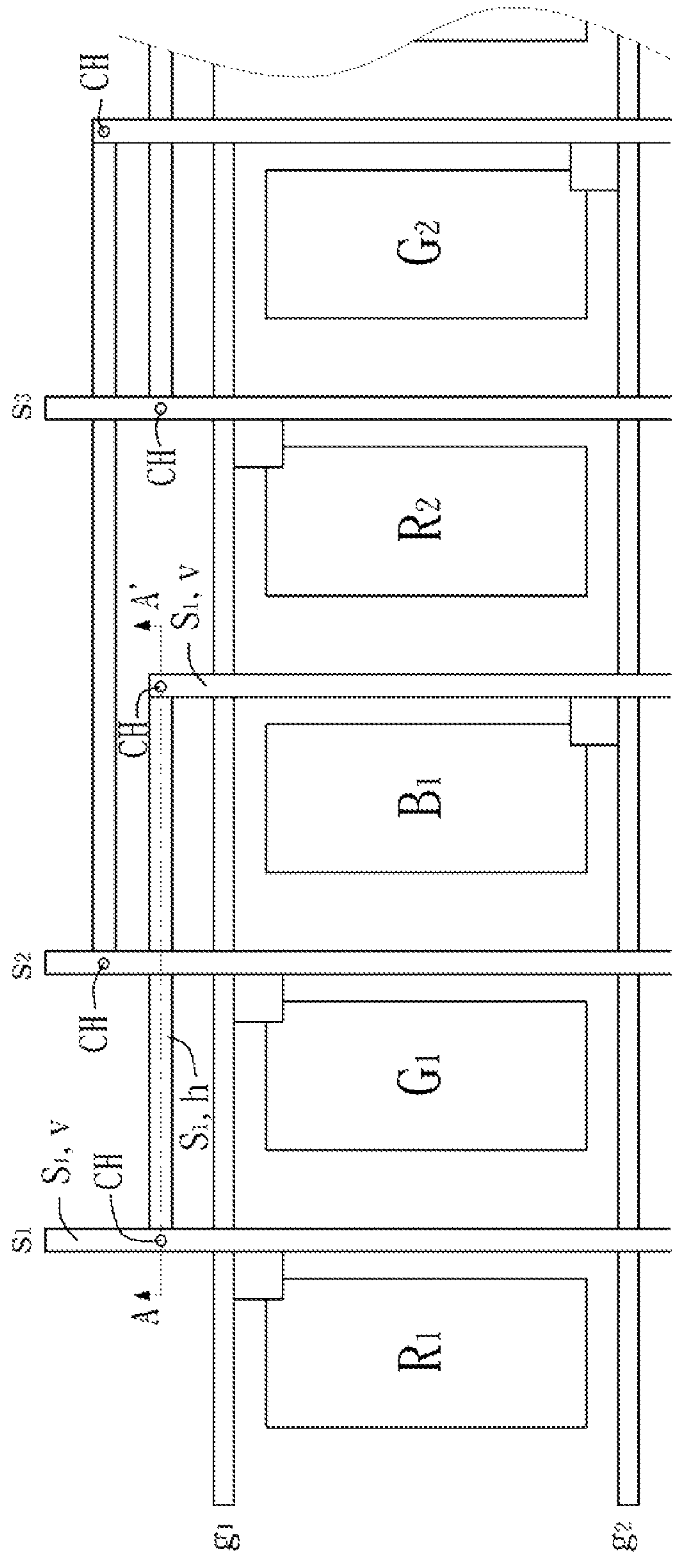
Figure 3B:
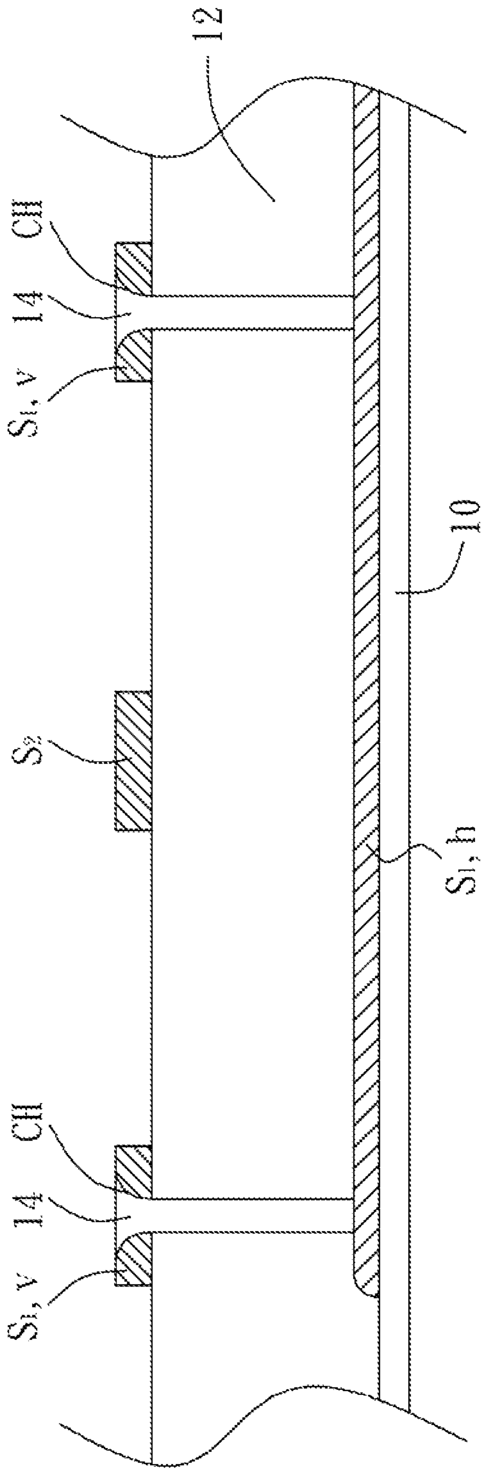

In the above preferred embodiment, because one data line uses two sub-data lines respectively connecting pixel electrodes of one column of pixels, a proper design must be employed to avoid the contact of two data lines at their intersection. FIG. 3A and FIG. 3B show a data line structure according to an embodiment of this invention, in which FIG. 3B is a cross-sectional view taken along line A-A' shown in FIG. 3A, and this data line structure can be used in the embodiment shown in FIG. 2A. As shown in FIG. 3A and FIG. 3B, each data line, such as data line s1, comprises a primary portion (s1, v) and a secondary portion (s1, h). The secondary portion (s1, h) is arranged below the primary portion (s1, v), which comprises a contact hole CH filled with a conductive material 14, so as to connect the secondary portion (s1, h). An insulation layer 12 is arranged between the primary portion (s1, v) and the secondary portion (s1, h), and the secondary portion (s1, h) is preferably arranged at the periphery of the pixel array or the outside of the view zone of the liquid crystal display. In addition, the secondary portion (s1, h) is preferably formed with the gate lines in a same step using same material, so that the number of fabricating steps and the cost will not be increased. The above-mentioned principle is suitable for all data lines. This design can avoid the contact of two data lines at the intersection. Notice that the primary portion may comprise sub-data lines as described in FIG. 2A. For example, the primary portion (s1, v) of the data line s1 comprises the sub-data line s11 and sub-data line s12. In addition, in another embodiment of this invention, the primary portion (s1, v) is arranged below the secondary portion (s1, h), which comprises a contact hole CH filled with a conductive material 14, so as to connect the secondary portion (s1, h).

Figure 4A:
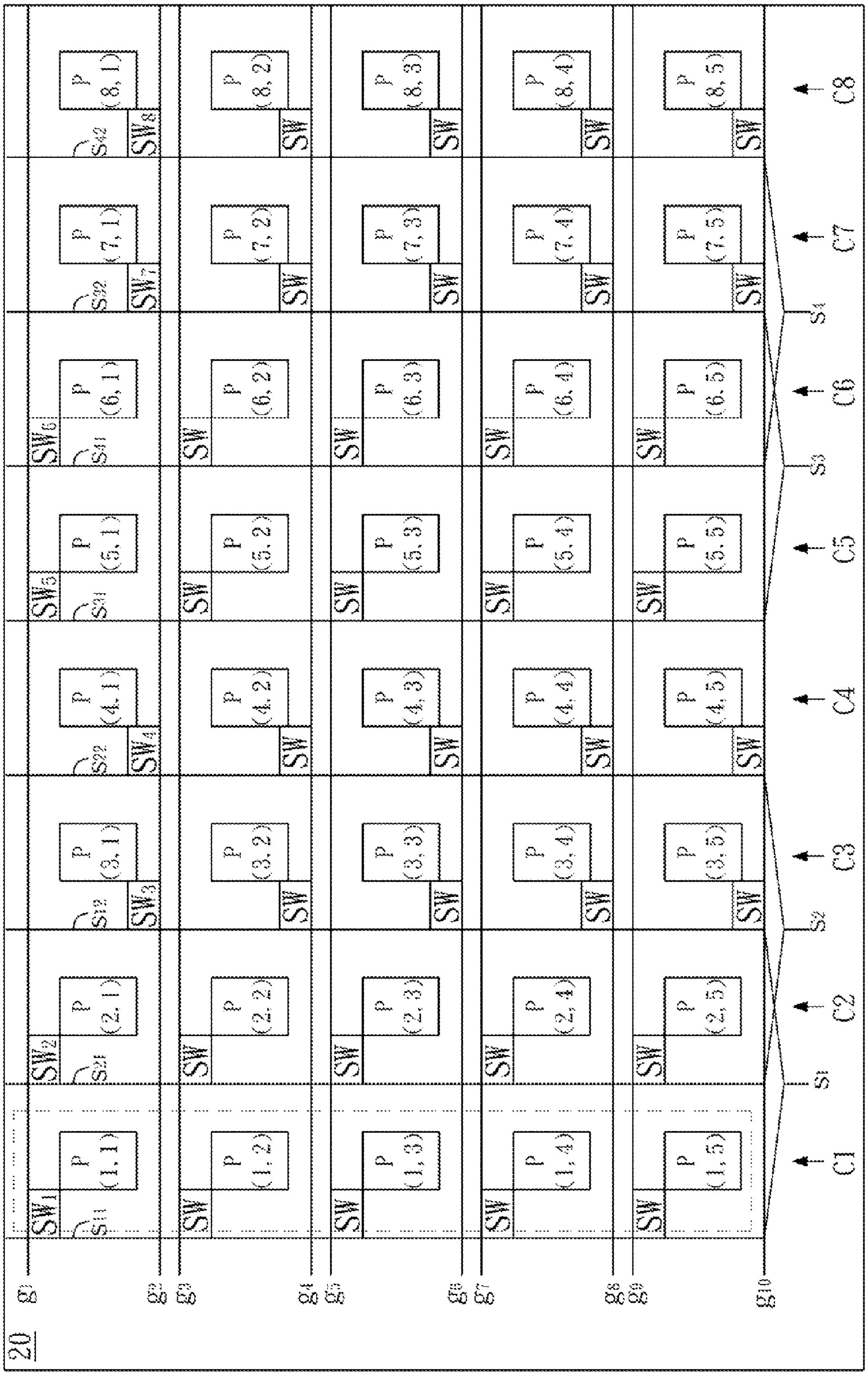
Figure 4C:
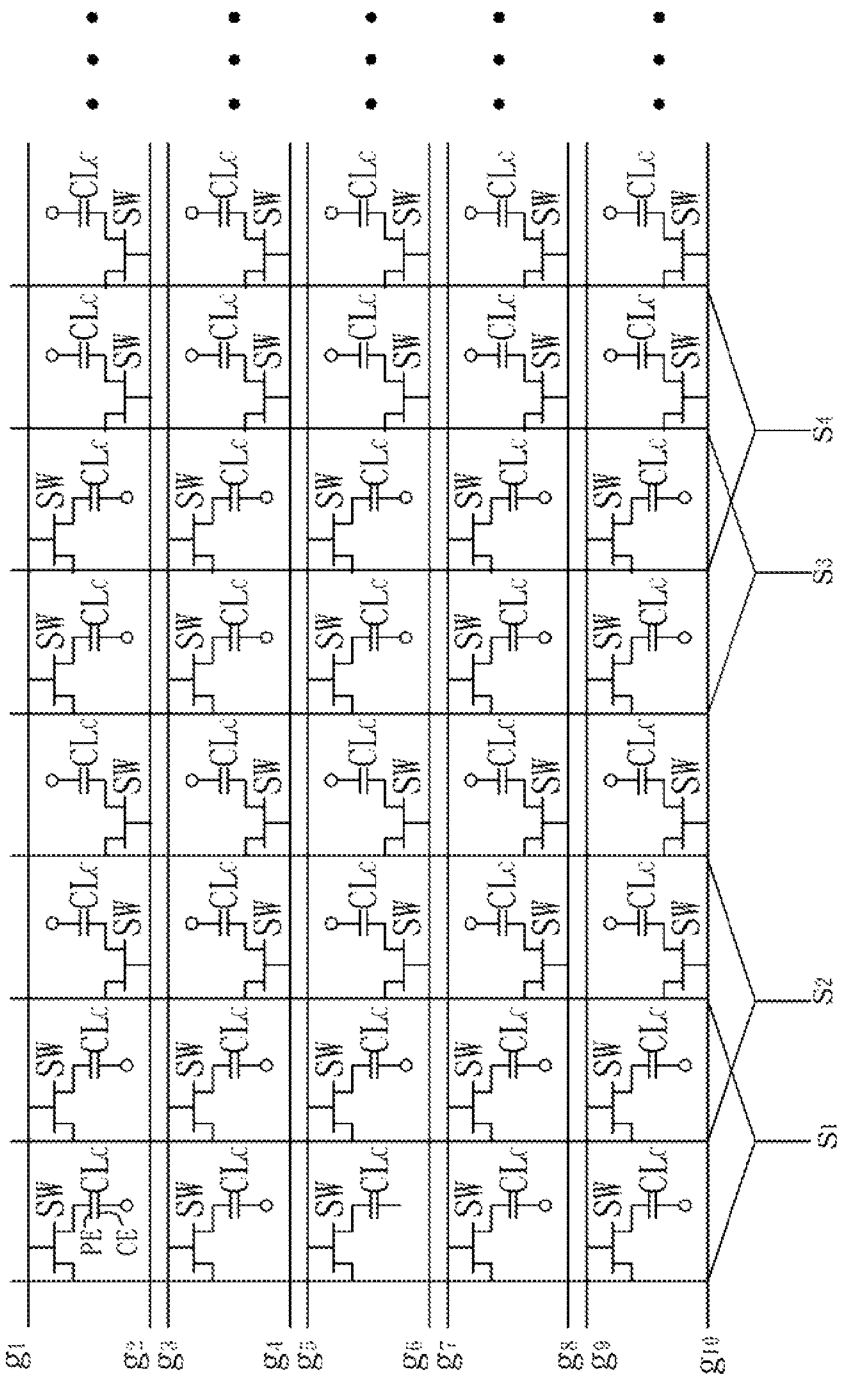

FIG. 4A to FIG. 4C shows a liquid crystal display according to a second embodiment of this invention, in which FIG.

4A shows its pixel structure, FIG. 4B shows the driving map between the pixel electrodes, data lines, and gate lines, and FIG. 4C shows its circuit diagram.

Referring to FIG. 4A, the liquid crystal display of this embodiment comprises a thin-film transistor substrate 20 (also referred to as "lower substrate" in this context), an upper substrate (not shown), and a liquid crystal layer arranged between the upper substrate and the thin-film transistor substrate 20.

In addition, the thin-film transistor substrate 20 comprises a pixel array constructed by gate lines (g1, g2 . . . g10) and data lines (s1, s2 . . . s4), which are orthogonal to each other. Each pixel comprises a pixel electrode, such as P(1,1), P(2,1), P(3, 1) . . . P(8, 1), and each pixel may denote a color, such as red, blue, or green. The gate lines connect to at least one gate driver (not shown), and the data lines connect to at least one data driver (not shown). Each data line comprises two sub-data lines, and each sub-data line connects to pixel electrodes of one column of pixels of the pixel array, such that each data line connects to two columns of pixels, where the connected two columns are not adjacent to each other, and another one column of pixels are interposed between the connected two columns of pixels. For example, the data line s1 comprises two sub-data lines s11 and s12 respectively connecting to the pixel electrodes of column C1 and column C3, and column C2 is interposed between the connected Columns C1 and C3; the data line s2 comprises two sub-data lines s21 and s22 respectively connecting to the pixel electrodes of column C2 and column C4, and column C3 is interposed between the Columns C2 and C4.

In addition, the pixels of each row are driven by two gate lines. In each row of pixels, the pixel electrodes of the Nth and (N+1)th pixels respectively connect to one gate line via their individual switch SW, and the pixel electrodes of the (N+2)th and (N+3)th pixels respectively connect to the other gate line via their individual switch SW, where N denotes positive odd integers, such as 1, 5, 9 . . . , and so on. For example, if N is 1, the pixel electrodes P(1, 1) and P(2, 1) respectively connect to the gate line g1 via the thin-film transistor switch SW1 and SW2, and the pixel electrodes P(3, 1) and P(4, 1) respectively connect to the gate line g2 via the thin-film transistor switch SW3 and SW4.

The foregoing structures not only can reduce the number of data lines to one half, and hence reduce the number of the data drivers and cost, but also can maintain the display quality. Referring to FIG. 4A and FIG. 4B, when a scan voltage is inputted to the gate line g1 to open the thin-film transistor SW1, SW2, SW5, and SW6, the data lines s1-s4 respectively input a pixel voltage to the pixel electrodes P(1,1), P(2,1), P(5,1), and P(6,1) via the thin-film transistors SW1, SW2, SW5, and SW6. After that, a low voltage is inputted to the gate line g1, the scan voltage is inputted to the gate line g2 to open the thin-film transistor SW3, SW4, SW7, and SW8, and the data lines s1-s4 respectively input a pixel voltage to the pixel electrodes P(3,1), P(4,1), P(7,1), and P(8,1) via the thin-film transistors SW3, SW4, SW7, and SW8. In the meanwhile, although the potentials are remained in the pixel electrodes P(1,1), P(2,1), P(5,1), and P(6,1), one sub-data line is interposed between each two adjacent pixel electrodes, so as to cancel out the capacitance couple between two adjacent pixel electrodes and thus maintain the display quality.

In addition, the driving ways of the pixel electrodes of the second row to the fifth row are similar to the first row as described above. FIG. 4B shows the detail.

FIG. 4C is a circuit diagram of the second embodiment. Each pixel comprises a pixel capacitance Clc constructed by a pixel electrode PE and a common electrode CE, and each pixel electrode PE connects to one data line and one gate line via a switch SW, such as a thin-film transistor. For example, a gate of the thin-film transistor SW connects to one gate line, a source of the thin-film transistor SW connects to one data line, and a drain of the thin-film transistor connects to the pixel electrode PE. Notice that other switches capable of performing the same functions as the thin-film transistor may replace it in other embodiments of this invention.

It is also appreciated that although the second embodiment only illustrates four data lines and ten gate lines, actually the number of the data lines and the gate lines may be more. In addition, the same driving mechanism may be used for liquid crystal display having various numbers of data lines and gate lines.

Figure 5:
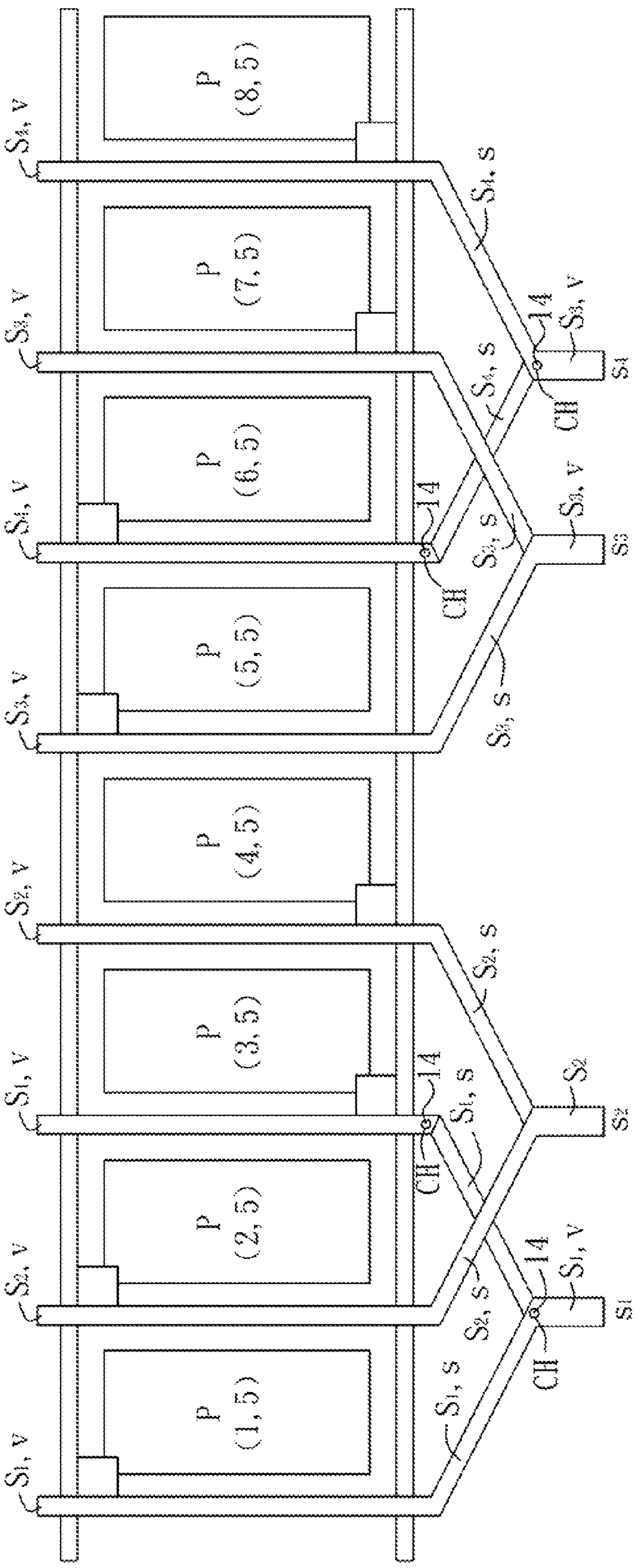
FIG. 5 shows a data line structure according to an embodiment of this invention, which can be used in the embodiment shown in FIG. 4A.

In the second embodiment, because one data line uses two sub-data lines respectively connecting pixel electrodes of one column of pixels, a proper design must be employed to avoid the contact of two data lines at their intersection. FIG. 5 shows a data line structure according to an embodiment of this invention, which can be used in the embodiment shown in FIG. 4A. As shown in FIG. 5, each data line, such as data line s1, comprises three primary portions (s1, v) and two secondary portions (s1, s), in which at least one secondary portion (s1, s) is arranged below one primary portion (s1, v), which comprises a contact hole CH filled with a conductive material 14, so as to connect the secondary portion (s1, s). An insulation layer (not shown) is arranged between the primary portions (s1, v) and the secondary portions (s1, v), and the secondary portions (s1, h) are preferably arranged at the periphery of the pixel array or the outside of the view zone of the liquid crystal display. In addition, the at least one secondary portions (s1, s) arranged below the primary portion (s1, v) is preferably formed with the gate lines in a same step using same material, so that the number of fabricating steps and the cost will not be increased. The above-mentioned principle is suitable for all data lines. This design can avoid the contact of two data lines at the intersection. Notice that the primary portion may comprise sub-data lines as described in FIG. 4A. For example, the primary portion (s1, v) of the data line s1 comprises the sub-data line s11 and sub-data line s12. In addition, in another embodiment of this invention, the two secondary portions of each data line are symmetrically arranged, and each secondary portion has an angle with respect to the primary portion of the data line, i.e., the sub-data line. The angle may range from about 90° to about 160°, and preferably range from about 120° to about 150°. Notice that the data line structure shown in FIG. 5 may also be used in embodiment of FIG. 2A.

Figure 6:
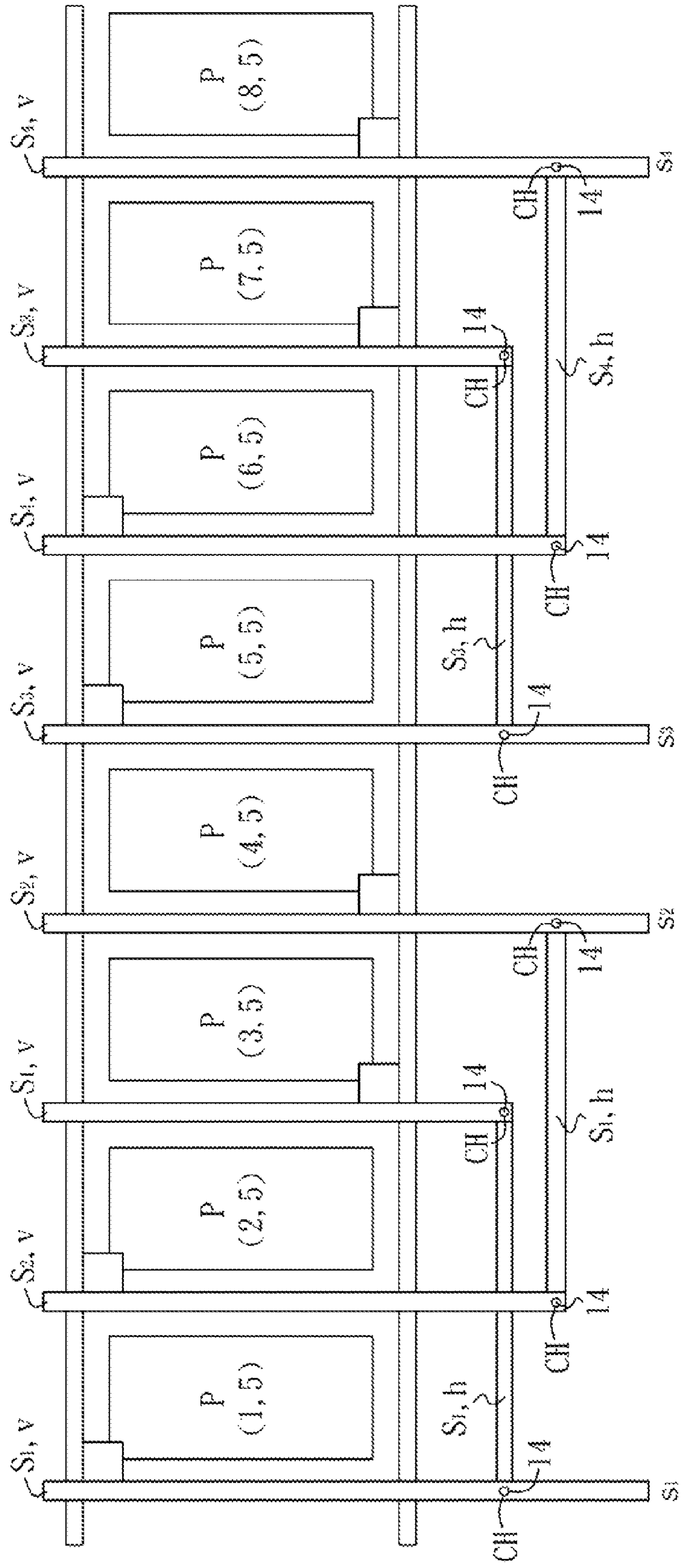
FIG. 6 and FIG. 7 respectively show a data line structure according to two embodiments of this invention, which can be used in the embodiment shown in FIG. 4A.
Figure 7:
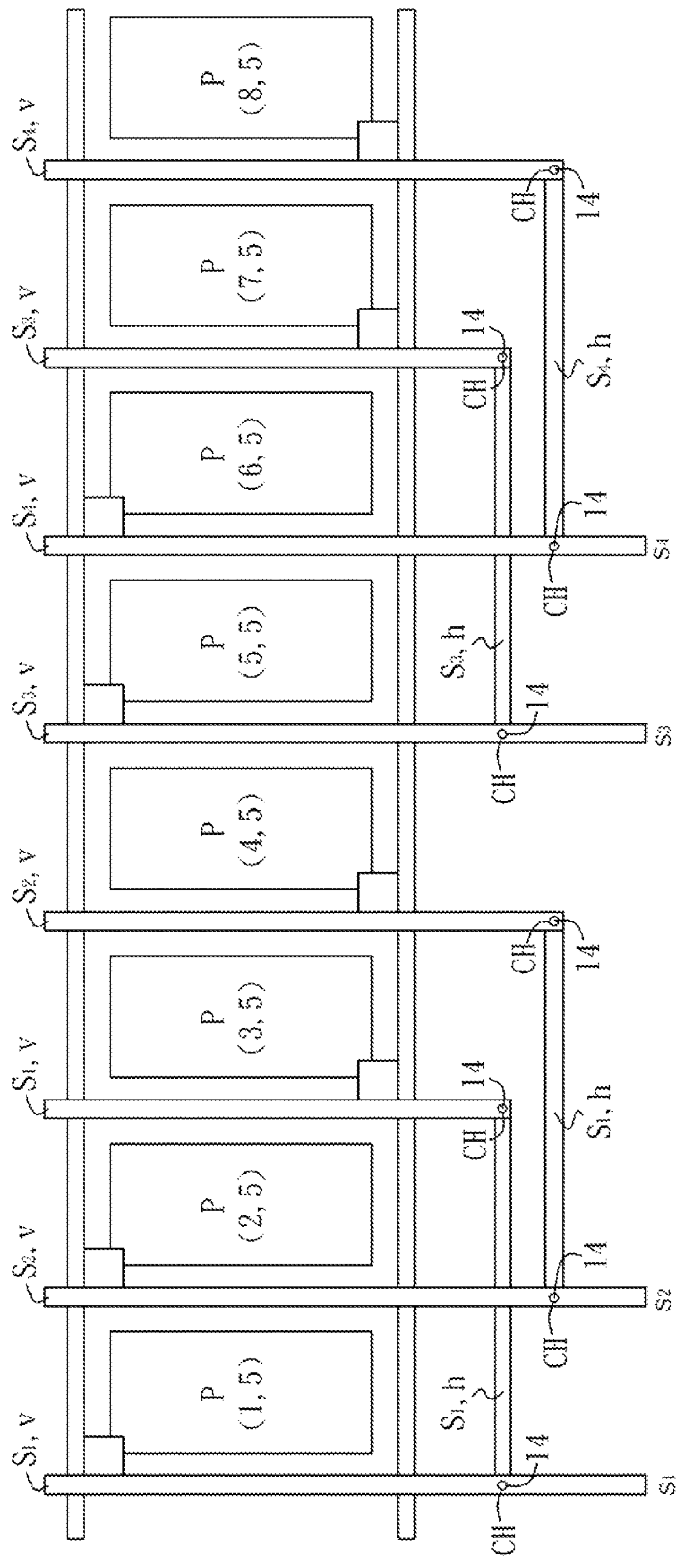

FIG. 6 and FIG. 7 respectively show a data line structure according to two embodiments of this invention, which can be used in the embodiment shown in FIG. 4A. Each data line comprises two primary portions and one secondary portion, which is used for connecting the two primary portions. Method for the connection is the same as described before, such as FIG. 5; the detail is therefore omitted for simplicity. The embodiments of FIG. 6 and FIG. 7 feature in that: for FIG. 6, the distance between the longer one of two primary portions of one data line and the longer one of two primary portions of another adjacent data line, is about the 3-fold width of one pixel; for FIG. 7, the distance between the longer one of two primary portions of one data line and the longer one of two primary portions of another adjacent data line, is the 1-fold width of one pixel. Notice that the data line structures shown in FIG. 6 and FIG. 7 may also be used in embodiment of FIG. 2A.

Although specific embodiments have been illustrated and described, it will be appreciated by those skilled in the art that various modifications may be made without departing from the scope of the present invention, which is intended to be limited solely by the appended claims.

What is claimed is:

1. A liquid crystal display, comprising:

a thin-film transistor substrate, an upper substrate, and a liquid crystal layer arranged between the upper substrate and the thin-film transistor substrate, the thin-film transistor substrate comprising a pixel array constructed by a plurality gate lines and a plurality of data lines orthogonal to the gate lines, wherein except a first data line and a last data line of the data lines, each data line comprises two sub-data lines, and each sub-data line connects to pixel electrodes of one column of pixels of the pixel array, such that each data line connects to two columns of pixels, wherein the connected two columns are not adjacent to each other, and another two columns of pixels are interposed between the connected two columns of pixels.

2. The liquid crystal display as recited in claim 1, wherein the first data line and the last data line respectively comprises two sub-data lines respectively connecting to pixel electrodes of one column of pixels of the pixel array, wherein the connected two columns are not adjacent to each other, and another one column of pixels is interposed between the connected two columns of pixels.

3. The liquid crystal display as recited in claim 1, wherein the pixel electrodes of each row of pixels are driven by two of the gate lines, except a first pixel and a last pixel in each row of pixels, the two pixel electrodes of any two adjacent pixels connect to two different gate lines.

4. The liquid crystal display as recited in claim 1, wherein each data line comprises a primary portion and a secondary portion arranged below the primary portion, and the primary portion comprises a contact hole filled with a conductive material to electrically connect the secondary portion.

5. The liquid crystal display as recited in claim 4, wherein an insulation is arranged between the primary portion and a secondary portion.

6. The liquid crystal display as recited in claim 4, wherein the secondary portion and the gate lines are arranged at the same layer.

7. A liquid crystal display, comprising:

a thin-film transistor substrate, an upper substrate, and a liquid crystal layer arranged between the upper substrate and the thin-film transistor substrate, the thin-film transistor substrate comprising a pixel array constructed by a plurality gate lines and a plurality of data lines orthogonal to the gate lines, wherein each data line comprises two sub-data lines, and each sub-data line connects to pixel electrodes of one column of pixels of the pixel array, such that each data line connects to two columns of pixels, wherein the connected two columns are not adjacent to each other, and another one columns of pixels is interposed between the connected two columns of pixels;

wherein the pixel electrodes of each row of pixels are driven by two of the gate lines, the two pixel electrodes of the Nth and (N+1)th pixels respectively connect to one of the two gate lines, and the two pixel electrodes of the (N+2)th and (N+3)th pixels respectively connect to the other of the two gate lines, wherein N denotes positive odd integers as 1, 5, 9 . . . , and so on.

8. The liquid crystal display as recited in claim 7, wherein each data line comprises at least one primary portion and a plurality of secondary portions, wherein at least one of the plurality of secondary portions is arranged below the at least one primary portion, and the at least one primary portion comprises a contact hole filled with a conductive material to electrically connect the at least one secondary portion.

9. The liquid crystal display as recited in claim 8, wherein an insulation is arranged between the at least one primary portion and the at least one secondary portion arranged below the at least one primary portion.

10. The liquid crystal display as recited in claim 8, wherein the at least one secondary portion arranged below the at least one primary portion and the gate lines are arranged at the same layer.

* * * * *